S. BRUNSON.
Nut-Lock.
No. 202,407. Patented April 16, 1878.
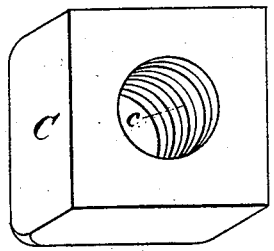
Fig. 1.
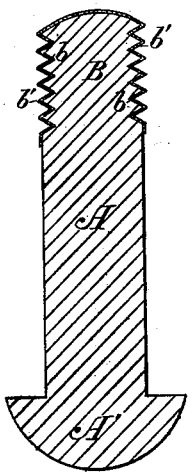
Fig. 2.
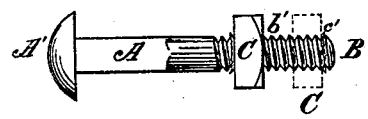
Attest:
H. H. Schott
D. P. Cowl
Inventor:
Sterne Brunson
By N. Cranford
atty.

UNITED STATES PATENT OFFICE.

STERNE BRUNSON, OF BENTON HARBOR, ASSIGNOR OF ONE-HALF HIS RIGHT TO JULIUS O. ANTISDALE, OF MUSKEGON COUNTY, MICHIGAN.

IMPROVEMENT IN NUT-LOCKS.

Specification forming part of Letters Patent No. 202,407, dated April 16, 1878; application filed February 16, 1878.

*To all whom it may concern:*

Be it known that I, STERNE BRUNSON, of Benton Harbor, in the county of Berrien and State of Michigan, have made certain Improvements in Screw-Bolts, of which the following is a specification:

The object of my improvement is to secure the nut or burr upon a screw-bolt in such manner as that it will not turn back or become loose upon the screw-bolt by constant jarring or concussion; and my invention consists in the treatment of the screw-thread of the bolt in such manner that the nut will not be turned loose without great force is used to turn the nut back, as will be fully hereinafter described.

In the drawings, Figure 1 represents a screw-bolt with the screw-nut detached, and Fig. 2 represents a screw-bolt with the nut turned onto the bolt.

A is the body of a screw-bolt; A', the head, and B the part in which the screw-thread $b$ is cut, in the usual manner for screw-bolts. $b'$ is a coating of soft metal that covers the surface of the screw-threads $b$, which may be of soft solder, tin, lead, zinc, or other quite soft metal that will adhere to the bright surface of the freshly-cut screw-threads on the bolt.

In the bolt represented in this instance soft solder is used to cover the screw-threads of the bolt.

The coating of soft metal $b'$ may not be very thick; but practice will indicate how much in thickness can be laid on and have the nut turn onto the bolt and up to its work to hold whatever it is required to hold without causing all the soft metal to be removed from the thread as the nut is turned up.

C is the ordinary screw-nut, with the internal screw-thread $c$ cut therein in the ordinary manner.

In tapping the nut C to cut the screw-threads $c$ therein, the tap is slightly tapering, which leaves the side of the nut at which the tap entered a trifle the largest in diameter, so that it will, when entered upon the end of the screw-bolt, easily find its path on the screw-threads to be turned up to its work, and the screw-threads $b$ will be cut by the die to receive and have the nut easily turn thereon before the soft metal $b'$ is applied.

When the screw-threads are treated to such a coating of soft metal by dipping the same into melted soft metal, or by other equivalent means to have the soft metal adhere, and the nut C turned up to its work, the soft metal is compacted within the screw-threads of the bolt, so that the screw-threads in the nut will have a perfect fit in all parts within the thickness of the nut, and, as it is made to bear hard against what it is to hold, the pressure is equally distributed from all parts toward the opposite side of the nut, thus preventing any looseness or jar to affect the nut in its hold, because every part of the threads in the nut has a direct and positive bearing upon the threads of the bolt, which holds the nut firmly to its work without loosening.

The reversal of the nut, or the turning it back in ever so slight a movement, will produce abrasion of the soft metal, as shown at $c'$, Fig. 2, which will prevent the nut from turning back or becoming loosened by jar or concussion or other accidental means.

This improvement in bolts is especially adapted to be used on fish-plates for securing the joints in railroad-rails, and on the rolling stock of railroads, common road-vehicles, and in all places where the nuts on screw-bolts are liable to turn back, and thereby loosen their hold.

The screw-threads $c$ of the nut C may be coated for the same purpose; but I prefer to coat the threads of the bolt, as answering a better purpose.

I am aware that the surfaces of screw-bolts have been gilded, plated, or covered with other metals for the purpose of ornamentation, or to prevent oxidation; but such covering of the bolt is not my invention; nor is the purpose or result the same as in my invention, as, by covering the threads of the screw, either on the bolt or in the nut, with the soft metal, the nut, in being turned up, compacts the soft metal upon the threads, fills all spaces, and makes it difficult to turn the nut back, and thereby forms a lock to the nut.

What I claim is—

As a means for preventing the loosening or the turning back of nuts on bolts threaded to fit each other, a coating of soft metal, $b'$, applied to the threads of either the bolt A or to the threads $c$ of nut C, or to both, substantially as and for the purpose set forth.

STERNE BRUNSON.

Witnesses:
A. PLUMMER,
A. C. HUNTER.